UNITED STATES PATENT OFFICE.

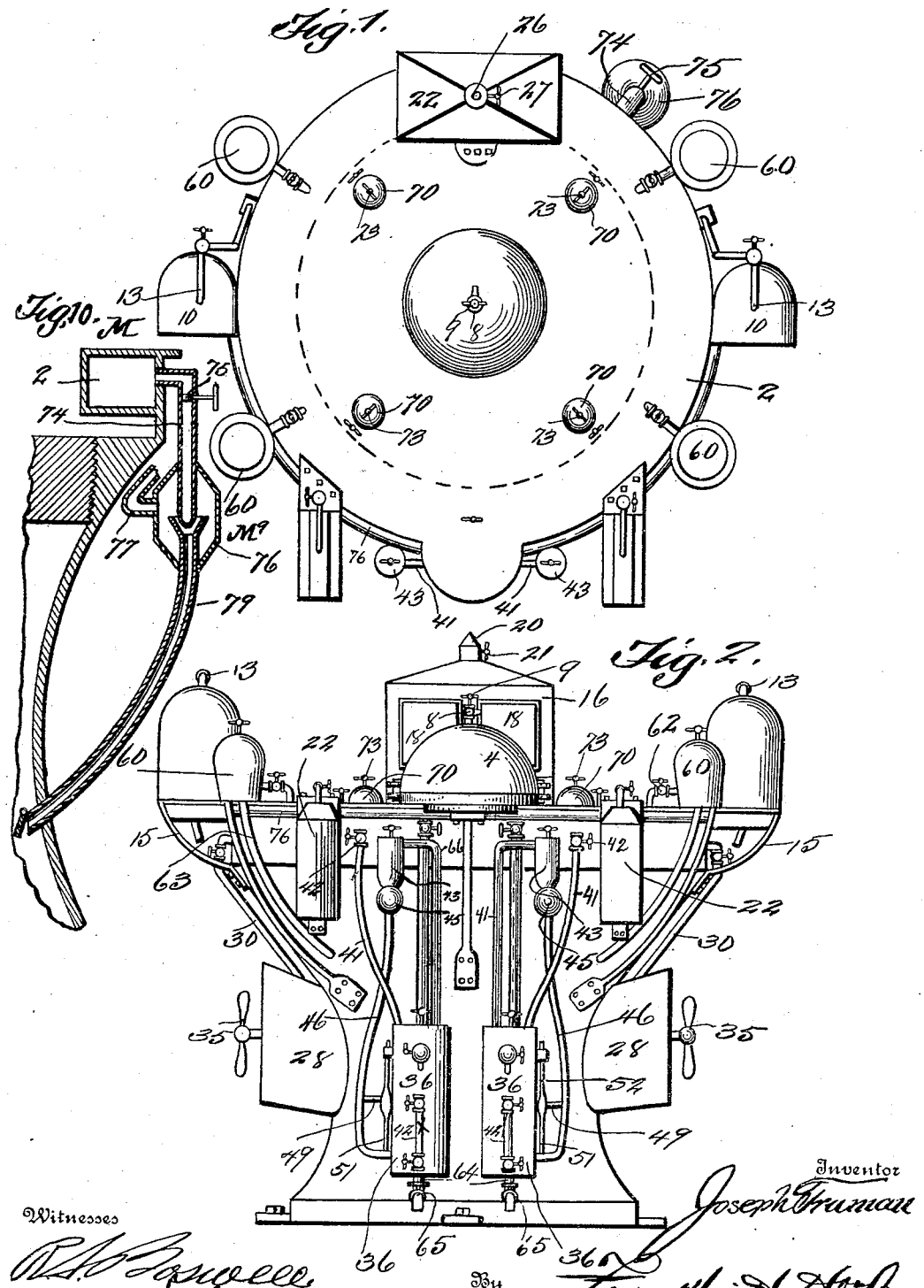

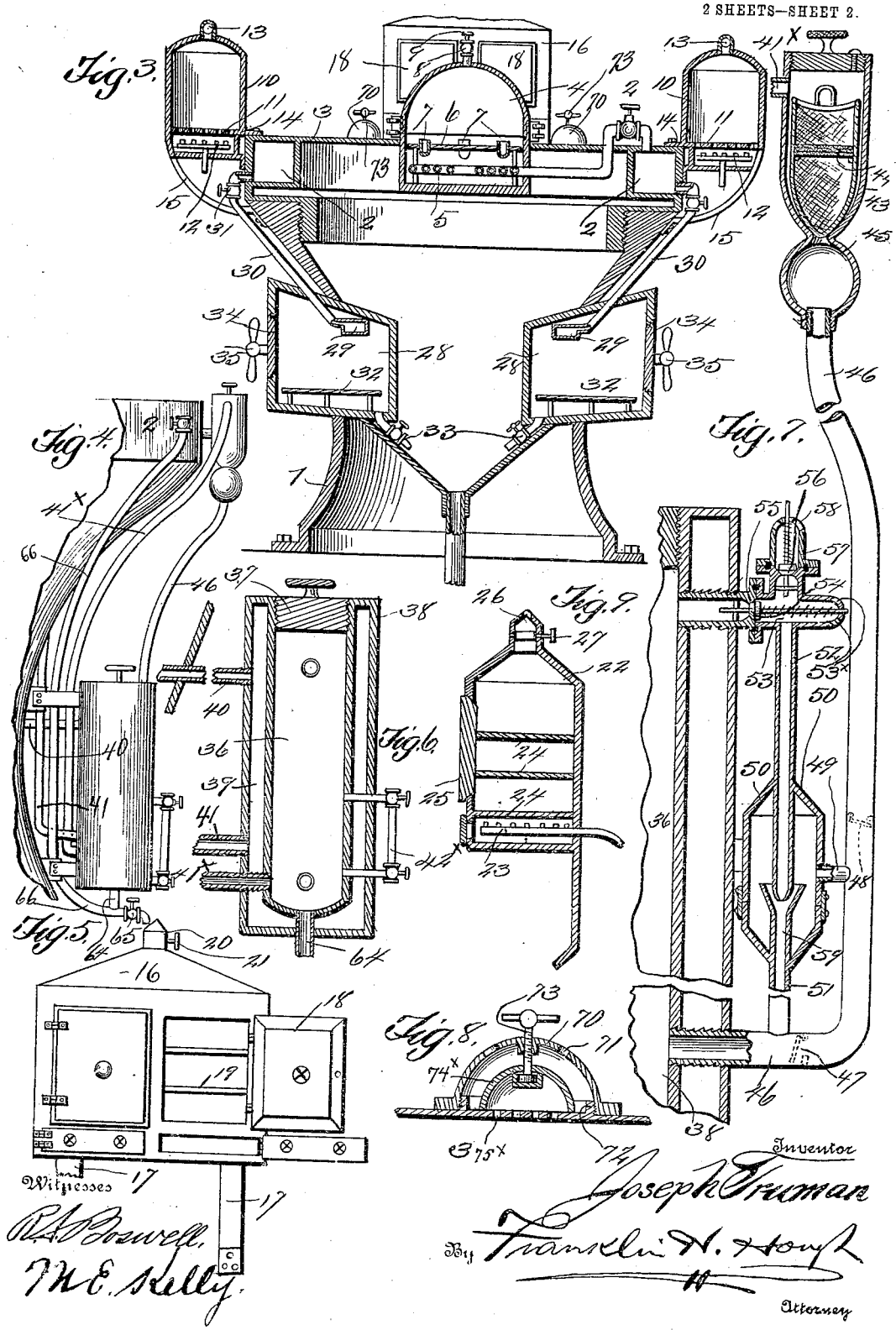

JOSEPH TRUMAN, OF HANOVER, NEW HAMPSHIRE.

COOKING APPARATUS.

931,814.	Specification of Letters Patent.	Patented Aug. 24, 1909.

Application filed May 13, 1908. Serial No. 432,751.

*To all whom it may concern:*

Be it known that I, JOSEPH TRUMAN, a citizen of the United States, residing at Hanover, in the county of Grafton and State of New Hampshire, have invented certain new and useful Improvements in Cooking Apparatus; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in a steam and gas cooking apparatus designed especially for buffet, parlor and sleeping cars, hotels, restaurants, etc., and comprises various details of construction, combinations and arrangements of parts which will be hereinafter fully described and then specifically defined in the appended claims.

My invention is illustrated in the accompanying drawings, in which:—

Figure 1 is a top plan view of the apparatus. Fig. 2 is a side elevation. Fig. 3 is a vertical central sectional view. Fig. 4 is an enlarged detail in elevation. Fig. 5 is an enlarged detail view of a baking oven, forming a part of the apparatus. Fig. 6 is a sectional view through a circulating storage tank. Fig. 7 is an enlarged detail sectional view through a portion of the circulating tank and coffee or tea filter having communication with a circulating tank. Fig. 8 is an enlarged detail view, and Fig. 9 is a sectional view through a bake oven attachment. Fig. 10 is a detail sectional view through a portion of the apparatus.

Reference now being had to the details of the drawings by numerals, 1 designates a suitable casing of the apparatus, made of any material such as metal, and 2 designates a circular outlined steam chest to which steam is supplied from any suitable source and from which it is fed to the various parts of the apparatus for cooking and heating purposes. The top of said steam chest has a laterally projecting plate 3 with a central opening in which a poacher, designated by numeral 4, is positioned, which latter is provided with a steam coil 5 and has a rack 6 therein, in which the cups 7 are held and has an exit pipe 8 with a valve 9 therein, through which pipe the fumes from the interior of the poacher may make escape.

Mounted about the outer circumference of the steam chest 2 at intervals are the friers, designated by numeral 10, each of which has a perforated grate 11 therein and a gas burner 12 underneath said grate, and at the upper end of each of said frying receptacles is an exit pipe 13, through which the smoke and fumes may be conveyed away therefrom. Each of said frying receptacles is provided with a flange 14 which is bolted or otherwise secured to the top of the steam chest and the outer portion of each is reinforced by a bracket arm 15 which is bolted or otherwise secured to the casing of the apparatus, as shown clearly in Fig. 3 of the drawings. A superstructure of the apparatus containing the steam chest and attachments has threaded connection with the casing, as shown clearly in Fig. 3 of the drawings, and so arranged that parts may be easily removed if desired for any purpose.

A baking oven, designated by numeral 16, is supported upon the bracket arms 17 upon the top of the steam chest in the manner shown in Figs. 1 and 3 inclusive, an enlarged detail of said oven being shown in Fig. 5 of the drawings, in which doors 18 are provided to close the openings in the side thereof and shelves 19 are mounted within the oven upon which articles may be placed. A suitable vent, designated by numeral 20, is provided and has a damper 21 therein.

Positioned at any convenient location about the periphery of the steam chest are the broiling attachments, designated by numeral 22, an enlarged detail view of one of said broilers being shown in Fig. 9 of the drawings, and is provided with a gas burner 23 and grates 24 and has an opening in each side thereof with a closure or door 22 by which access may be had to the interior of the broiler. Said broilers are fastened at their lower ends to the circumference of the casing in any suitable manner. The upper end of each broiler is provided with a vent 26 regulated by a damper 27. In the drawings, I have illustrated two of said broilers positioned spaced apart from the circumference of the casing.

Suitable steaming apartments, designated by numeral 28, are provided, each of which is provided with a steam spraying chamber 29, shown in section in Fig. 3 and each has communication with the steam chest through the pipe 30, having a valve 31 therein. There are two of said steaming compartments shown opposite each other in Figs. 2 and 3 of the drawings and in each is mounted a rack or support 32 upon which articles to be steamed may be placed and each compartment has a valve-regulated exit tube 33 and a closure 34 which is preferably circular in outline and has threaded connection with the marginal edge of an opening in the side of the chamber. Each closure 34 has a handle 35. Circulating chambers, designated by numeral 36, are provided as shown in their proper relative positions in Fig. 2 and in section in Figs. 6 and 7, each of which has a threaded plug 37 fitting its upper end and a surrounding shell 38 forming, intermediate the same and the circumference of the inner chamber, a circulating space 39 communicating with which are the pipes 40 and 41, the former of which is an exit pipe and the latter a steam inlet pipe. Said pipe 41 communicates with the steam chest, as shown clearly in Fig. 2 of the drawings, and has a valve 42 regulating the flow of steam through said pipe. Each of said circulating chambers has a pressure gage $42^\times$, whereby the condition of the contents of the chamber may be determined.

A coffee or tea filter, designated by numeral 43, has a suitable filtering material therein, such as a strainer 44, and a fabric in which the material is filtered and communicates with a receiving chamber 45 which in turn has a pipe 46 communicating therewith, the other end of said pipe leading to and communicating with the interior of the circulating chamber 36, as shown clearly in Fig. 7 of the drawings. Said pipe 46 is provided with suitable check valves 47 and 48 and has a branching pipe 49 leading laterally into the chamber 50 which communicates at one end through the pipe 51 with the pipe 46 and its other end through a pipe 52 with a valve chamber 53, having a spring-pressed valve 54 therein regulating a passageway 55 which communicates with the interior of the circulating chamber as shown. A spring-pressed safety valve 56 is mounted in the shell 57 which communicates with the casing in which the valve 54 is mounted and affords means whereby excessive pressure of the steam may make exit through the perforations 58. When the valve 54 acts under a pressure, preferably of three or four pounds, the air in the chamber 53 will escape through the perforations $53^\times$. In the event of the pressure of the steam being excessive in the chamber 53 and pipe 52 leading therefrom, the valve 56 will unseat and lower the excessive steam to the atmosphere through the perforations 58. A funnel shaped tube 59, communicates with the pipe 51 at the lower end of the pipe 52, which is formed into a nozzle, extends into the funnel end of said tube 59 and is adapted, as steam is forced through the nozzle, to cause a suction to draw the liquid which has filtered through the coffee or tea filter through into the circulating chamber, the suction being through the pipe 49 and also through the pipe 46. Suitable steam cups 60 are positioned about the steam chest and each has a pipe 62 communicating between the same and the steam chest to and an exit pipe 63 leading from the bottom through the wall of the casing. Leading from the lower end of the circulating chamber is an exit pipe 64 connecting with a pipe 66 having a spigot 65 therein, thereby affording means for draining the circulating chamber when desired.

Referring to Figs. 1, 3 and 8 of the drawings will be seen a dome-shaped shell 70, each of which is perforated as at 71 and has threaded connection with a boss 72 upon the plate 3. Each of said shells carries a screw 73, the lower end of which is fastened to a cup-shaped shell $74^\times$ adapted to rest when at its lowest limit upon the plate 3 and cover the perforations $75^\times$. By raising and lowering said screw, the shell $74^\times$ may be raised to regulate the exit of steam and fumes through the perforations $75^\times$ and 71 to the atmosphere.

In order to allow the fumes to be withdrawn from the tube 76 and caused to escape into the interior of the casing 1, a pipe 79 (Fig. 10) is provided, the lower end of which extends through the wall 1, while its upper end is funnel shaped. A nozzle 74 having a valve 75 therein leads into the interior of the chamber 76 and into which latter the funnel shaped end of the pipe 79 also passes, and the free end of the nozzle 74 extends a slight distance into the funnel end of said pipe 79. A pipe 77 communicates with the interior of the chamber 76 and through which objectionable fumes may be drawn to the latter by the suction formed by the live steam passing through the nozzle pipe 74 into the funnel end of the pipe 79 and thence drawn by the force of the steam through the pipe 79 into the interior of the casing 1.

The operation of the filter feed of my invention is as follows:—The coffee and water to be filtered are placed in the interior of the receptacle 36 and live steam entering the space about the circumference of the receptacle 36 and surrounding the latter is caused to heat its contents. The live steam after heating the coffee within said receptacle 36, will make exit through the pipe 40 into the interior of the casing 1. When the contents of the receptacle are heated and steam generated therein from the water the solution of coffee will be forced through the pipe $41^\times$, which leads from the lower portion of the receptacle 36, and will pass into the filter receptacle 43 where the liquid will percolate through the parts within the filter, thence through the pipe 46 back to the receptacle 36. The steam and fumes of the liquid as it passes from the receptacle 36 to the filter will escape the opening in the plug in the top of the filter 43 to the atmosphere. This process continues until the contents are ready for use, after which the opening in the plug in the top of the receptacle 45 is closed. When the pressure within the receptacle 36 rises to a certain degree, the steam generated from the liquid therein will force its way from the valve 54 into the passageway 53 thence down the pipe 52 and, as the steam passes through the nozzle into the upper end of the funnel shaped pipe 59, thence into the pipe 46, the suction is formed within the pipe 46 which will cause the liquid within the filter to percolate therethrough and circulate back into the receptacle 36. When the pressure within the receptacle 36 becomes excessive, the steam will escape above the passageway 53 under the pressure in the upper end of the chamber 57. It will be understood, however, that, when the heat becomes excessive incident to the feeding of the live steam into the space about the receptacle 36, the supply of the live steam may be cut off, thereby reducing the temperature of the liquid within the receptacle 36 and reducing the pressure of steam accordingly. When it is desired to use the coffee, it may be drawn from the exit pipe in the lower end of the receptacle 36.

It will thus be seen that, by the provision of an apparatus as shown and described, not only are means provided for various purposes, such as baking ovens, poaching, steaming apparatus, etc., in a compact form, but a percolator formed and the provision of means for causing the objectionable fumes rising from the cooking to be drawn by suction into the interior of the casing and the provision of a simple and efficient means afforded for making coffee of proper consistency.

From the foregoing, it will be noted that by the apparatus herein described, which is designed especially for use upon buffet cars, hotels, etc., a compact cooking apparatus is afforded adapted for all of the various uses of a cooking department.

What I claim to be new is:—

1. A cooking apparatus comprising a casing, a steam chest therein, a circulating chamber, a shell about said chamber communicating with said steam chest, a filter receptacle, circulating pipes communicating between said filter receptacle and circulating chamber, and an injector mechanism for causing a circulation between the chamber and filter receptacle, as set forth.

2. A cooking apparatus comprising a casing, a steam chest therein, a circulating chamber, a shell about said chamber communicating with said steam chest, a filter receptacle, circulating pipes communicating between said filter receptacle and circulating chamber, a spring-pressed pressure valve in said circulating passageway, and an injector mechanism for causing a circulation between said receptacle and chamber, as set forth.

3. A cooking apparatus comprising a casing, a steam chest therein, a circulating chamber, a shell surrounding said chamber with a space intervening between the same, a pipe communicating between said space and steam chest, an exit pipe leading from said space through into the interior of said casing, a filter receptacle, a pipe communicating between the upper portion of the latter and the interior of said circulating chamber, a receiving chamber communicating between said receiving chamber and circulating chamber, an injector apparatus communicating one end with the circulating chamber and its other end with the pipe which leads from the receiving chamber, and a safety valve positioned in the passageway in which the injector mechanism is positioned, as set forth.

4. A cooking apparatus comprising a casing, a steam chest therein, a circulating chamber, a shell surrounding said chamber with a space intervening between the same, a pipe communicating between said space and steam chest, an exit pipe leading from said space through into the interior of said casing, a dome-shaped shell fitted over a perforated portion of the top of said casing, a cup-shaped valve mounted within said dome-shaped shell and over said perforations, means for raising and lowering said valve, a filter receptacle, a receiving chamber communicating between the receiving chamber and the interior of the circulating chamber, a pressure valve containing pipe leading through said shell and entering the circulating chamber, an injector apparatus communicating with said pressure valve pipe and the pipe which communicates between the receiving chamber and circulating chamber, as set forth.

In testimony whereof I hereunto affix my signature in the presence of two witnesses.

JOSEPH TRUMAN.

Witnesses:
NEWTON A. FROST,
ELEANOR L. FROST.